J. R. TAYLOR.
EVENER BAR OR THE LIKE.
APPLICATION FILED NOV. 9, 1916.
1,223,910.
Patented Apr. 24, 1917.
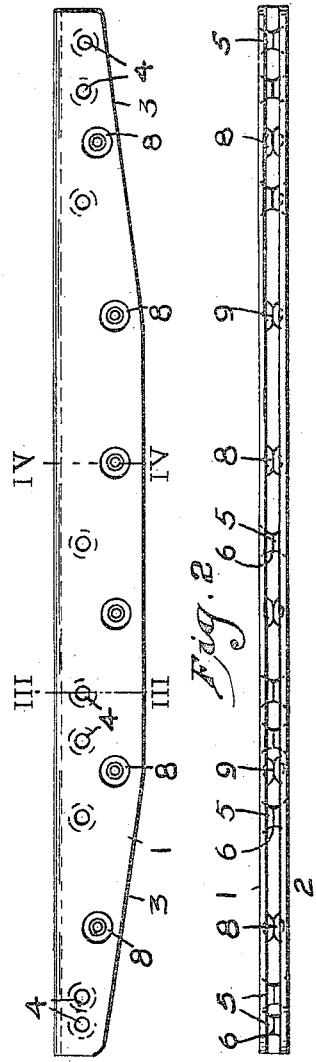
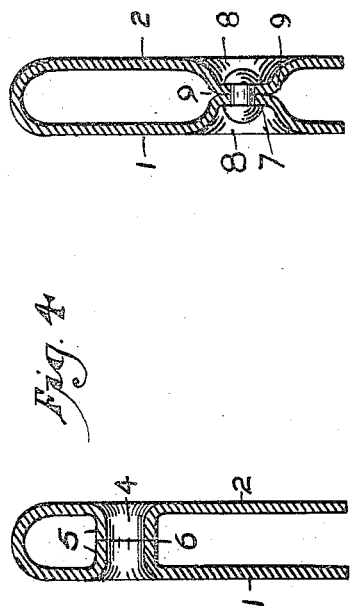
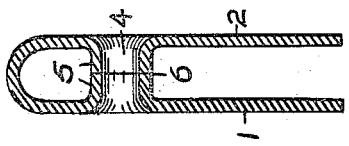
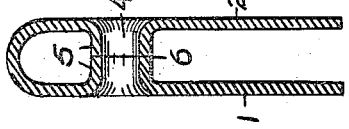
WITNESS
R. F. Dilworth
INVENTOR
John R. Taylor
by F. N. Barber
attorney

UNITED STATES PATENT OFFICE.

JOHN R. TAYLOR, OF BRACKENRIDGE, PENNSYLVANIA, ASSIGNOR TO ALLEGHENY STEEL COMPANY, A CORPORATION OF PENNSYLVANIA.

EVENER-BAR OR THE LIKE.

1,223,910. Specification of Letters Patent. Patented Apr. 24, 1917.

Application filed November 9, 1916. Serial No. 130,452.

*To all whom it may concern:*

Be it known that I, JOHN R. TAYLOR, a citizen of the United States, residing at Brackenridge, in the county of Allegheny and State of Pennsylvania, have invented new and useful Improvements in Evener-Bars or the like, of which the following is a specification.

My invention relates to pressed metal evener bars, doubletrees, and swingletrees. The principal object of this invention is the formation of an evener bar, doubletree, or swingletree from one piece of sheet metal bent to a U-shaped cross-section and having the open holes formed by punching and pressing and the rivet holes by punching and cupping.

Referring to the accompanying drawings, Figure 1 is a plan view of an evener bar constructed in accordance with the principles of my invention; Fig. 2, an edge view of the evener bar; Fig. 3, a section of Fig. 1 on the line III—III; and Fig. 4, a section of Fig. 1 on the line IV—IV.

On the drawings, I show an evener bar bent to a U-shaped cross-section as shown on Figs. 3 and 4, the contour of the opposite sides 1 and 2 being preferably alike. The evener bar is made narrower at its end portions than at its middle portion by shearing off the edges thereof on a taper as shown at 3 before the blank from which the evener bar is made is doubled or folded to U-shape.

4 indicates open holes extending transversely through the bar for the admission of bolts for the attachment of the evener bar to some part of a vehicle or other object to be moved and to some power for moving such vehicle or other object. These holes are each formed by punching two holes in the blank before it is doubled to U-shape and pressing the metal around the holes so as to form the hollow or tubular flanges 5, which, when the blank is doubled to U-shape, have their outer ends abutting each other or forming the butt joint 6, thereby making a spreader or spacing device between the sides 1 and 2.

7 represent holes in the bottom of the cups 8 pressed in the sides 1 and 2. These cups are pressed so that, when the metal is bent to U-shape, they will meet in pairs with their backs in engagement as shown at the joints 9. Rivets are passed through the registering holes in the pairs of cups and headed down on the bottoms of the cups so as to increase the rigidity of the evener bar and to prevent the sides 1 and 2 from opening or spreading apart. I have shown cups 8 circular but their shape may be elongated, if desired.

It will be seen that my invention may be used as a swingletree by connecting it through the central hole 4 to the end of a doubletree and through some of the end holes 4 to the tugs or traces of a harness; or it may be used as a doubletree by connecting it through the central hole 4 to the pole of a wagon and through some of its end holes 4 to the central parts of swingletrees; or it may be employed as an equalizing bar, as for automobile brakes, by connecting its central portion to a rod to which power is applied, for example, to the brake pedal, and its ends to objects to be moved, for example, to the brake-bands on the rear wheels.

I claim—

1. An evener bar or the like comprising one piece of sheet metal bent to U-shape and having opposite flanged openings, the ends of the opposing flanges forming butt joints.

2. An evener bar or the like comprising one piece of sheet metal bent to U-shape and having depressed perforated cups arranged in pairs back to back, and rivets in the perforations of each pair.

Signed at Brackenridge, Pa., this 7th day of November, 1916.

JOHN R. TAYLOR.